UNITED STATES PATENT OFFICE.

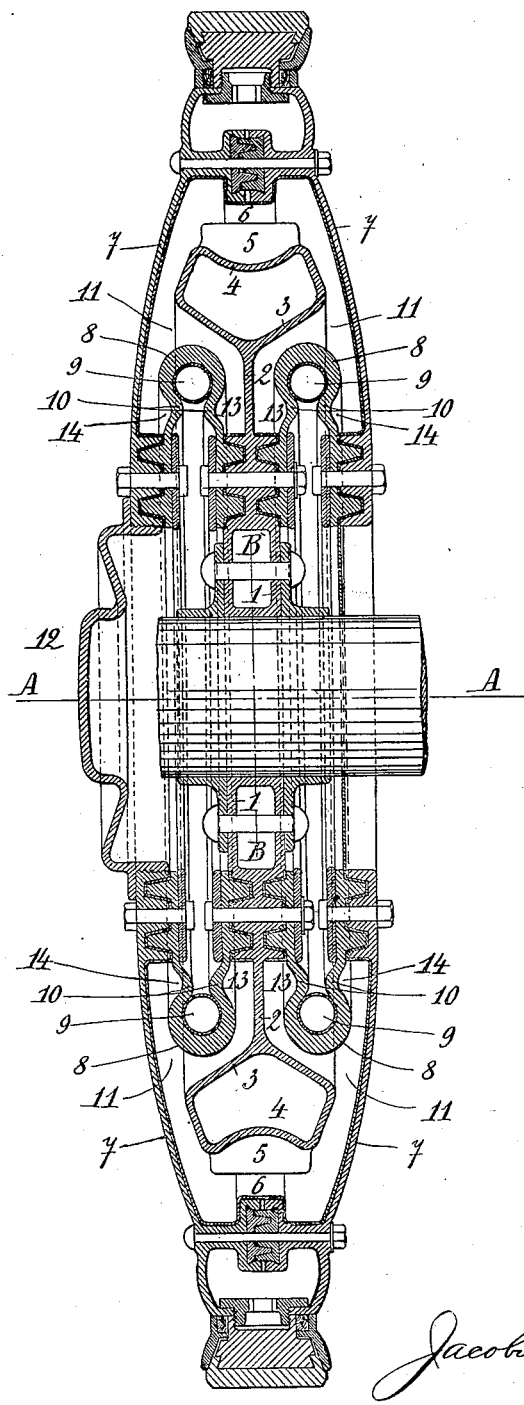

JACOBUS SPYKER, OF AMSTERDAM, NETHERLANDS.

ELASTIC WHEEL.

969,304.  Specification of Letters Patent.  Patented Sept. 6, 1910.

Application filed June 9, 1909. Serial No. 501,012.

*To all whom it may concern:*

Be it known that I, JACOBUS SPYKER, a subject of the Queen of the Netherlands, and residing at 141 Wesperzyde, Amsterdam, Netherlands, have invented a certain new and useful Improved Elastic Wheel, of which the following is a specification.

The present invention refers to an elastic wheel for vehicles of all kinds and particularly for automobiles.

The object of the invention is to obtain a wheel of great elasticity and of solid and relatively light construction, which can accommodate itself better than the known elastic wheels to all the stresses occurring in connection with such wheels; that is to say, not only to the vertical stresses resulting from the load on the vehicle and the unevenness of the road or the like, but also to all lateral stresses and those acting in the plane of the wheel, such as those resulting from the oscillating movement of the vehicle; the change in the direction of traveling; the lateral movements of the vehicle caused by the curves and gradients of the road when the vehicle is traveling at high speed, the changing of speed and the starting and stopping of the vehicle.

The invention consists essentially in supporting the central part, or the movement transmission parts of the wheel, on and in a medium under pressure within a completely closed rigid casing which forms the actual wheel, and in arranging flexible connections between the wheel and its axle such that a jointed suspending actuating and guiding frame is obtained capable of being displaced freely in any direction, so that the nave or the axle, without any fear of rupture can assume various inclinations and angular positions with respect to the central plane of the actual working wheel. The wheel can thus adapt itself to the various lateral strains or movements referred to above, while at the same time efficiently absorbing shocks and vibrations.

A part of the connection between the wheel and axle comprises a supporting buffer forming part of the axle support, said buffer moving relatively to, and displacing or compressing the medium under pressure within, the wheel casing, so that the buffer, while limiting the displacements of the nave with respect to the wheel, has the effect of reducing the interior space of the compressed air chamber and upon the occurrence of a sudden shock, of producing a compression and a displacement of air which will absorb the vibrations. The buffer may consist of a hollow body of comparatively large dimensions, preferably concave, at its periphery and may be provided with blades for directing the displacement of air.

The rigid case forming the traveling wheel may be made of "drawn steel" or the like, in several pieces fitted together, the arrangement of which and the method of connection by means of tight joints, are the subject of a concurrent application for Letters Patent.

Reference will now be made to the accompanying drawing, which shows, by way of example, a wheel constructed in accordance with the invention, in transverse section.

The form of construction shown in the drawing is also characterized by the fact that the nave can easily be detached from the wheel, so as to be able to be withdrawn together with the axle of the actual traveling wheel.

In carrying the invention into effect the nave mounted on the axle, is fastened to a center support, 1, having a disk-like extension 2 provided with a hollow supporting buffer 3, the outer edge 4 of which is preferably concave, and provided with blades 5. The rigid circular casing, 7, which forms an annular chamber is made of sheet steel or other suitable material and forms a compressed air chamber. Its inner wall comprises two flexible pockets, 8, each formed of indiarubber or other flexible and preferably elastic material of approximately U shaped section, hermetically connected on one side to the center disk or support, 2, for the nave, 1. The other side of each pocket is hermetically connected to the two side walls of the casing 7. Rings 9 which form an actuating and parallel jointed suspension are arranged in the pockets 8. The arrangement of tubular rings of circular cross section reduces the effect of lateral twist in the pockets, 8, to a minimum. The pockets 8 are preferably of such a size that the interior diameter of the pockets is greater than the exterior diameter of the rings 9, so that the latter are inclosed to a certain extent by the indiarubber bands 8, owing to the constriction 10 of the pockets 8 under the pressure of air within the interior space 11 of the casing 7.

The circular casing is closed in the center on the side remote from the vehicle, by means of a cover 12 which can be unscrewed from the case, and on the other side an opening is left so that the axle and nave may be inserted. The chamber, 11, is filled with compressed air by means of a pump or the like fitted to the tube of a suitable valve in the side of the casing 7. The axle and nave are inserted and the latter is fastened to the center support 1, the cover 12 being screwed on to the side of the wheel. When in use and owing to the load of the vehicle on the axle, the support 1, 2 and buffer 3 are lowered and at the same time decentralized with respect to the wheel casing 7 till they rest on the air cushion in the chamber or casing, 7. At the same time, with this movement, the sides 13 of the pockets 8 give, while the sides 14 are stretched, the rings 9 moving downward and being decentralized. This displacement occurs without twisting taking place in the parts of the pockets which are situated at this moment on both sides of the wheel owing to the presence of a constricted portion, 10, of the material of the pockets which portion can give. When this occurs new constricted parts are produced so that the rings although displaced are still more or less inclosed in the pockets 8 and insure the desired transmission and at the same time the force absorbed in pushing in the constricted parts of the pockets contributes to a certain extent to the absorption of the vibrations. By means of the two interior pockets, 8, and the rigid rings 9, a system of jointed parallel suspension is obtained, which permits the axis A A of the nave or of the axle and its support 1, 2, 3, 8, 8 to assume certain inclinations or angular positions with respect to the center plane B B of the wheel, such positions being controlled by circumstances depending on the running of the wheel.

Owing to the fact that the wheel is resilient with respect to its axis A A, the tire of the wheel will firmly adhere to the ground for any position of the wheel. Furthermore, lateral strains will not have any injurious effect either on the solidity or hermetic connection of the parts fitted together.

For the purpose of preventing the air being forced back directly by the buffer 3, 4 toward the upper part of the wheel when vertical movements occur but rather to direct it toward the part situated immediately above the buffer 3, 4, blades 5 may be fitted on the exterior surface of the buffer, such blades extending in the direction of the spokes. These blades will contribute to the absorption of vibrations.

Having now described my invention what I claim as new and desire to secure by Letters Patent is:—

1. An elastic vehicle wheel comprising in combination, a hollow annular casing forming the wheel frame, an axle and nave within the frame, a buffer on the nave, and flexible connections extending from the buffer to the wheel frame permitting the wheel to assume various angular positions relatively to the axle.

2. An elastic wheel comprising in combination, a hollow annular wheel casing containing pressure fluid, an axle and nave surrounded by the casing, a buffer on the nave extending into and acting upon the pressure fluid in the casing, flexible pocket connections extending from the buffer to the wheel casing and rigid rings combined with the flexible connections in such a way that the rings and flexible connections may be displaced without twisting the connections.

3. An elastic wheel comprising in combination, a hollow annular wheel casing containing pressure fluid, an axle and nave surrounded by the casing, a buffer on the nave extending into and acting upon the pressure fluid, blades on the periphery of the buffer to prevent a direct driving back of the pressure fluid when shocks occur, and flexible connections extending from the buffer to the wheel casing.

4. An elastic wheel comprising in combination, a hollow annular wheel casing, containing pressure fluid, an axle and nave surrounded by the casing, a hollow buffer carried by the nave, concaved on its periphery and having outwardly formed blades extending within the interior of the wheel casing, and flexible connections between the buffer and wheel casing.

5. An elastic vehicle wheel comprising in combination, a hollow annular wheel casing containing pressure fluid, an axle and nave within the casing, a buffer on the nave extending into the casing, flexible connections extending from the buffer to the wheel casing, and tubular rings combined with the flexible connections, constituting a jointed parallel suspension for the axle whereby it may move relatively to the wheel casing and absorb vibrations and shocks.

6. An elastic vehicle wheel comprising in combination, a hollow annular wheel casing containing pressure fluid, an axle and nave within the casing, a buffer on the nave extending into the casing, flexible connections extending from the buffer to the wheel casing, and rings combined with the flexible connections, constituting a jointed parallel suspension for the axle whereby it may move relatively to the wheel casing and absorb vibrations and shocks.

7. An elastic vehicle wheel comprising in combination, a hollow annular wheel casing containing compressed air, an axle and nave surrounded by the casing, a hollow buffer connected to the nave and concave on its periphery, blades upon the buffer, constricted flexible pocket connections between the buffer and wheel casing, and rings within the pockets for the purpose described.

In testimony whereof I affix my signature in presence of two witnesses.

JACOBUS SPYKER.

Witnesses:
D. J. GRANAS,
A. HUIDEKOPER.